United States Patent [19]

Okazaki

[11] Patent Number: 5,012,454
[45] Date of Patent: Apr. 30, 1991

[54] ULTRASONIC LOW RANGE SPEED METER

[75] Inventor: Tadao Okazaki, Hamakita, Japan

[73] Assignee: Fujie Bussan Kabushiki Kaisha, Japan

[21] Appl. No.: 512,900

[22] Filed: Apr. 23, 1990

[30] Foreign Application Priority Data

Sep. 26, 1989 [JP] Japan ................................ 1-250351

[51] Int. Cl.⁵ .............................................. G01S 15/00
[52] U.S. Cl. .................................................... 367/89
[58] Field of Search ...................... 367/89, 95, 97, 105, 367/135; 73/861.25

[56] References Cited

U.S. PATENT DOCUMENTS

| 4,112,756 | 9/1978 | MacLennen et al. | 367/89 |
| 4,674,069 | 6/1987 | Mizumo | 367/89 |
| 4,685,093 | 8/1987 | Gill | 367/89 |

Primary Examiner—Ian J. Lobo
Attorney, Agent, or Firm—Lerner, David, Littenberg, Krumholz & Mentlik

[57] ABSTRACT

A speed meter measures low range speeds such as feed speeds on a machining devices. Ultrasonic waves are radiated against a mobile object performing a linear displacement with respect to a detection head, and ultrasonic waves reflected by the mobile object are used for controlling the state of a pair of signal gating elements. Clock pulses passed to the elements are gated over different periods phased from each other by an operation interval which can be adjusted depending on the process conditions. Distances between the detection head and the mobile object in the different periods are specified by count values obtained from the results of respective gating, and the average speed of the linear displacement of the mobile object is calculated on the basis of these count values. Digital mode processing of the signals simplifies the construction and lowers the production cost. Use of ultrasonic waves avoids negative influences caused by the state and configuration of the face of the mobile object, thereby enabling a wide range of application.

4 Claims, 5 Drawing Sheets

ULTRASONIC LOW RANGE SPEED METER

BACKGROUND OF THE INVENTION

The present invention relates to an ultrasonic low range speed meter, and more particularly relates to an improvement in non-contact mode measurement of the linear speed of a mobile object which moves at a speed as low as feed speeds on a machining apparatus.

A coherent optical system is conventionally used for non-contact mode measurement of a mobile object. This system is based on the principle of optical interference. Although this system assures measurement with high precision, its application is more or less limited depending on the optical nature of the reflective face of the mobile object whose linear speed should be detected. In addition, the system is rather complicate in construction and, as a consequence, very expensive. For these reasons, this system is adopted in applications in which measurement with high precision is strongly required.

An ultrasonic Doppler system is another conventional example of the non-contact mode. In the case of this system, however, if the sound speed is 342 m/sec, the linear speed of a mobile object is 1 mm/min and the frequency of the sound wave used for measurement is 100 kHz. The resultant Doppler frequency is equal to about 0.005 Hz. In other words, only one measured value is obtained within a period of 200 sec. This slow pace of measurement is quite unsuited for practical applications in which quick response in process control is wanted. In addition, this system does not exhibit a high degree of resolution in the low speed range measurement.

SUMMARY OF THE INVENTION

It is the object of the present invention to provide a speed meter of a simple construction and a low cost which is suited for measurement in a low speed range without any influence by the sonic nature of the reflective face of a mobile object.

In accordance with the basic aspect of the present invention, ultrasonic waves are radiated against a mobile object under a linear displacement, and reflective ultrasonic waves are used for controlling the state of a pair of gating elements. Clock pulses passing through these elements are gated over different periods intervened by an adjustable operation interval. Detected distances in different periods are specified by count values of the clock pulses obtained from the results of respective gating, and the average speed of the linear displacement during the operation interval is calculated on the basis of these count values.

DESCRIPTION OF THE PREFERRED EMBODIMENTS

Figure 1:
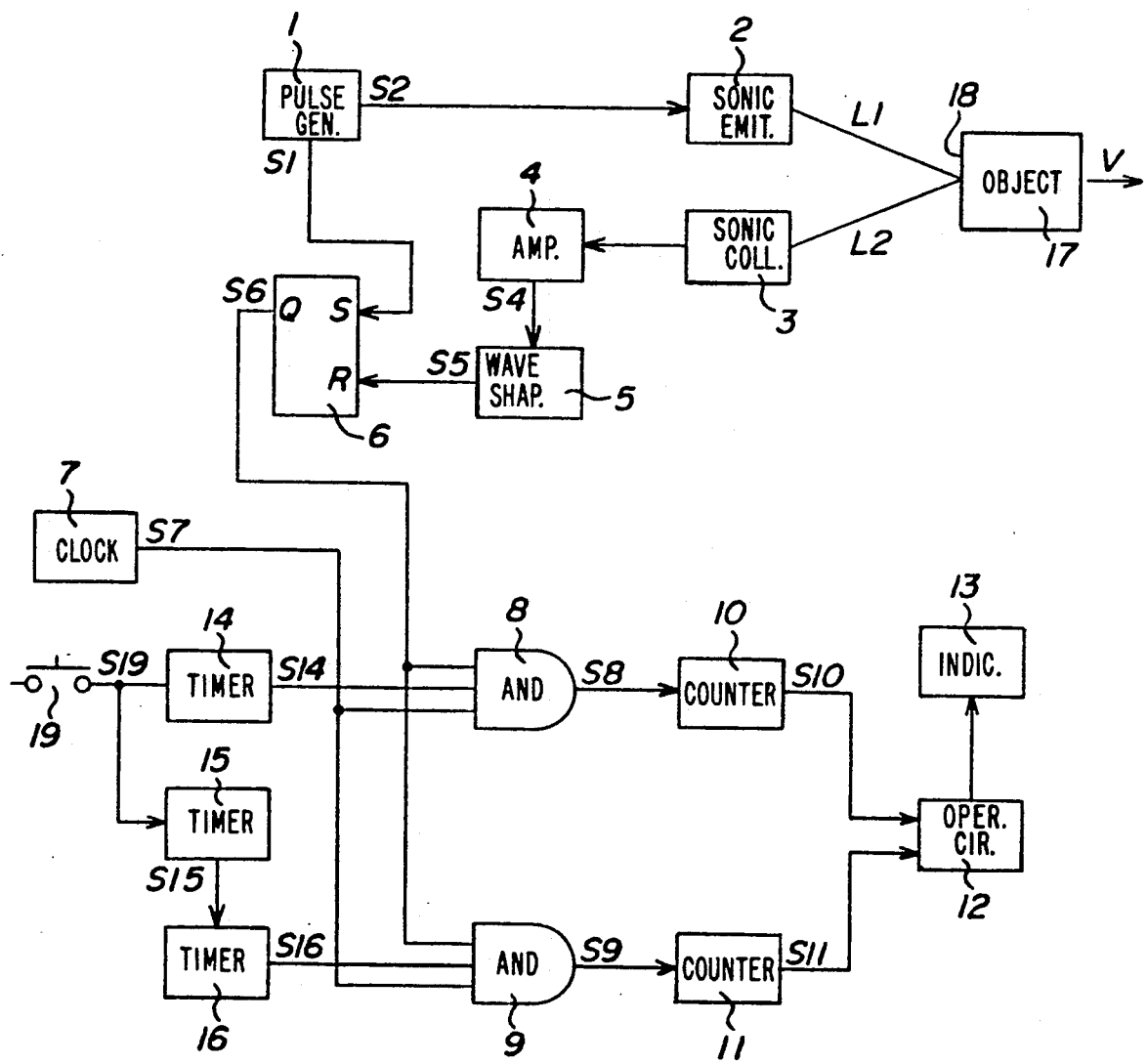
FIG. 1 is a block diagram of one embodiment of the speed meter in accordance with the present invention.
Figure 2:
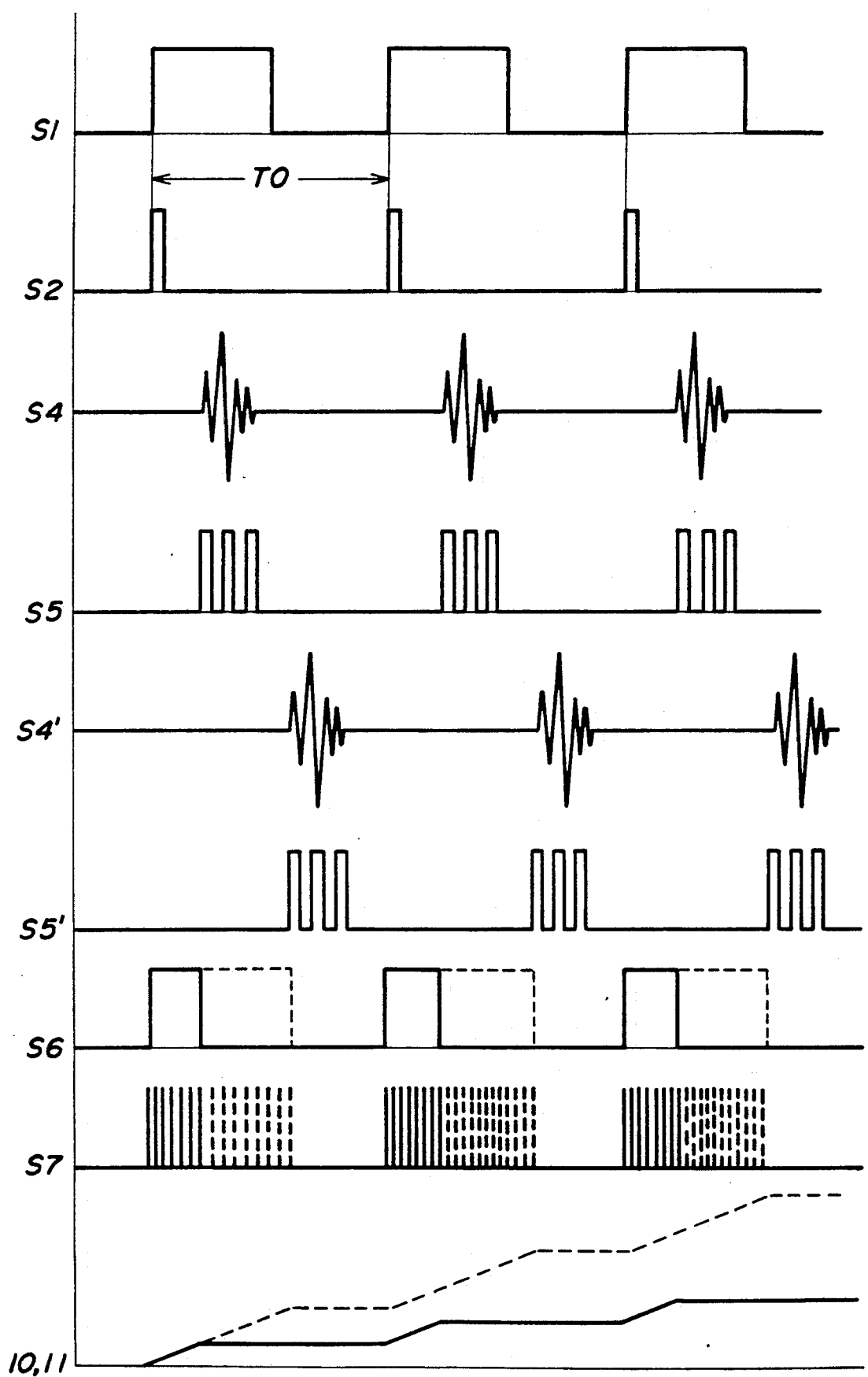
FIG. 2 is a diagram of signals generated by various elements in the speed meter shown in FIG. 1.

One embodiment of the speed meter in accordance with the present invention is shown in FIGS. 1 and 2, in which a detection head is made up of an ultrasonic emitter 2 and an ultrasonic collector 3 arranged as a pair facing the sound reflective face 18 of a mobile object 17. This mobile object 17 moves away from the detection head at a speed V. In the condition illustrated, the ultrasonic emitter 2 is separated from the reflective face 18 by a distance L1 and from the collector 3 by a distance L2. In general, the emitter distance L1 is different from the collector distance L2. In practice, however, the difference is negligible in the case of a short period measurement. The emitter 2 and the collector 3 both perform acousto-electric conversion in a known manner.

The ultrasonic emitter 2 is connected to one output terminal of a pulse generator 1. The pulse generator 1 issues two kinds of output signals S1 and S2 at different output terminals. The first output signal S1 is given in the form of a rectangular wave signal such as shown in FIG. 2 whereas the second output signal S2 is given in the form of a pulse wave signal in which each pulse appears at the rise of every rectangular wave of the first output signal S1. The second output signal S2 is passed to the ultrasonic emitter 2 for emission of a ultrasonic signal towards the reflective face 18 of the mobile object 17. The first output signal S1 is passed to the set terminal of a flip-flop 6 whose output terminal is connected in parallel to the first and second AND gates 8 and 9, respectively. Thus, when set, the flip-flop 6 issues an output signal S6 to be passed to the AND gates 8 and 9.

The ultrasonic signal reflected at the face 18 of the mobile object 17 is collected by the collector 3 and a corresponding electric signal is passed to an amplifier 4 which thereupon generates an output signal S4 such as shown in FIG. 2. This output signal S4 is wave shaped at a wave shaping circuit 5 which issues an output signal S5 shown in FIG. 2 wich is used for resetting of the flip-flop 6.

A clock pulse generator 7 generates an output signal S7 which is passed to input terminals of the first and second AND gates 8 and 9, respectively.

A start switch 19 is connected to the first and third timer 14 and 15 and the third timer 15 is connected to the second timer 16. On receipt of an output signal S19 from the start switch 19, the first timer issues an output signal S14 to be passed to the first AND gate 8. On receipt of an output signal S15 from the third timer 15, the second timer 16 issues an output signal S16 to be passed to the second AND gate 9.

When the input signals are all at H-level, the first AND gate 8 issues an output signal S8 which is counted at the first counter 10 whose output signal S10, the count value, is passed to an operational circuit 12. Likewise, the second AND gate 9 issues an output signal S9 which is counted at the second counter 11 whose output signal S11, the count value, also is passed to the operational circuit 12. The operational circuit 12 is optionally connected to an indicator 13 for visual indication of the operational results.

In FIG. 2, the signals S4 and S5 are issued at some position of the mobile object 17 before displacement whereas signals S4' and S5' are issued after displacement of the mobile object 17 from the position. As for the signal S7 in FIG. 2, solid lines indicate clock pulses accepted by the AND gates 8 and 9 when the output signal S6 is at H-level and the mobile object 17 is at the position before displacement. Likewise, the dotted lines indicate clock pulses accepted by the AND gates 8 and 9 when the output signal S6 is at H-level and the mobile object 17 is at the position after displacement. The output signals S10 and S11, the count values, vary as shown in the bottom illustration in FIG. 2 in which a solid line corresponds to the condition before displacement and a dotted line to the condition after displacement. From the illustration in FIG. 2, it is well understood that the count values of the counters 10 and 11 are proportional to the extent of displacement of the mobile object 17.

Figure 3:
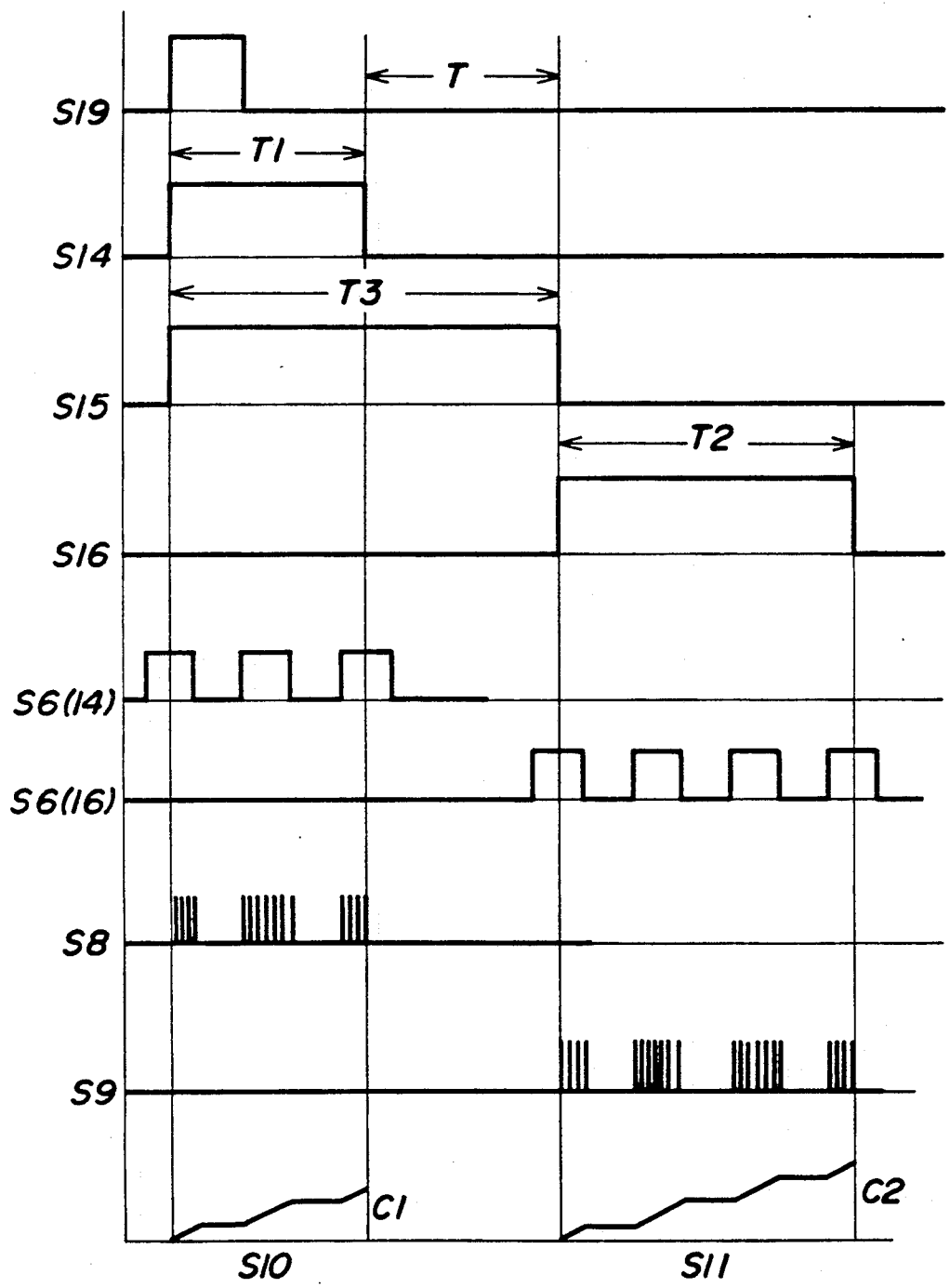
FIG. 3 is a timing diagram of signals processed in the speed meter shown in FIG. 1.

Operation of the speed meter shown in FIG. 1 is now explained in detail in reference to FIG. 3.

The first and second timers 14 and 15 are triggered when the start switch 19 is depressed, i.e. on receipt of the signal S19. The illustrated waves of the signal S6 from the flip-flop 6 are accepted by the first AND gate 8 which thereupon issues illustrated output signal S8. The first counter 10 counts the output signal S8 and generates the output signal S10, i.e. its count value.

The second timer 16 is triggered at the fall of the output signal S15 from the third timer 15. The illustrated waves of the signal S6 from the flip-flop 6 are accepted by the second AND gate 9 which thereupon issues illustrated output signal S9. The second counter 11 counts the output signal S9 and generates the output signal S11, i.e. its count value.

The end of the operation period T1 of the first timer 14 and the beginning of the operation period T2 of the second timer 16 is separated by an operation interval T and the length of this operation interval T is adjusted by the operation period T3 of the third timer 15.

The final count value C1 of the first counter 10, i.e. the output signal S10 at the end of the operation period T1 of the first timer 14, indicates the average detected distance, i.e. the emitter and collector distances (L1+L2) during the operation period T1 of the first timer 14. Likewise, the final count value C2 of the second counter 11, i.e. the output signal S11 at the end of the operation period T2 of the second timer 16, indicates the average emitter and collector distances (L1+L2) during the operation period of the second timer 16. As a consequence, the difference Δ C between the two final count values C1 and C2 corresponds to the extent of displacement of the mobile object 17 between the two operation periods T1 and T2. Then, the average speed of the mobile object 17 is obtained by dividing this difference Δ C by the operation interval T.

The foregoing analysis is presented mathematically as follows;

$$C1 = T1(L1+L2)/T0 \cdot T4 \cdot V0 \quad (1)$$

$$C2 = T2(L1+L2+V \cdot T3)/T0 \cdot T4 \cdot V0 \quad (2)$$

$$\Delta C = \{(L1+L2)(T2-T1)+T2 \cdot T3 \cdot V\}/T0 \cdot T4 \cdot V0 \quad (3)$$

T0; pulse period of the signal S2.
T1; operation period of the first timer 14.
T2; operation period of the second timer 16.
T3; operation period of the third timer 15.
T4; clock pulse period.
V0; sound speed.
V ; moving speed of the mobile object 17

Figure 4:
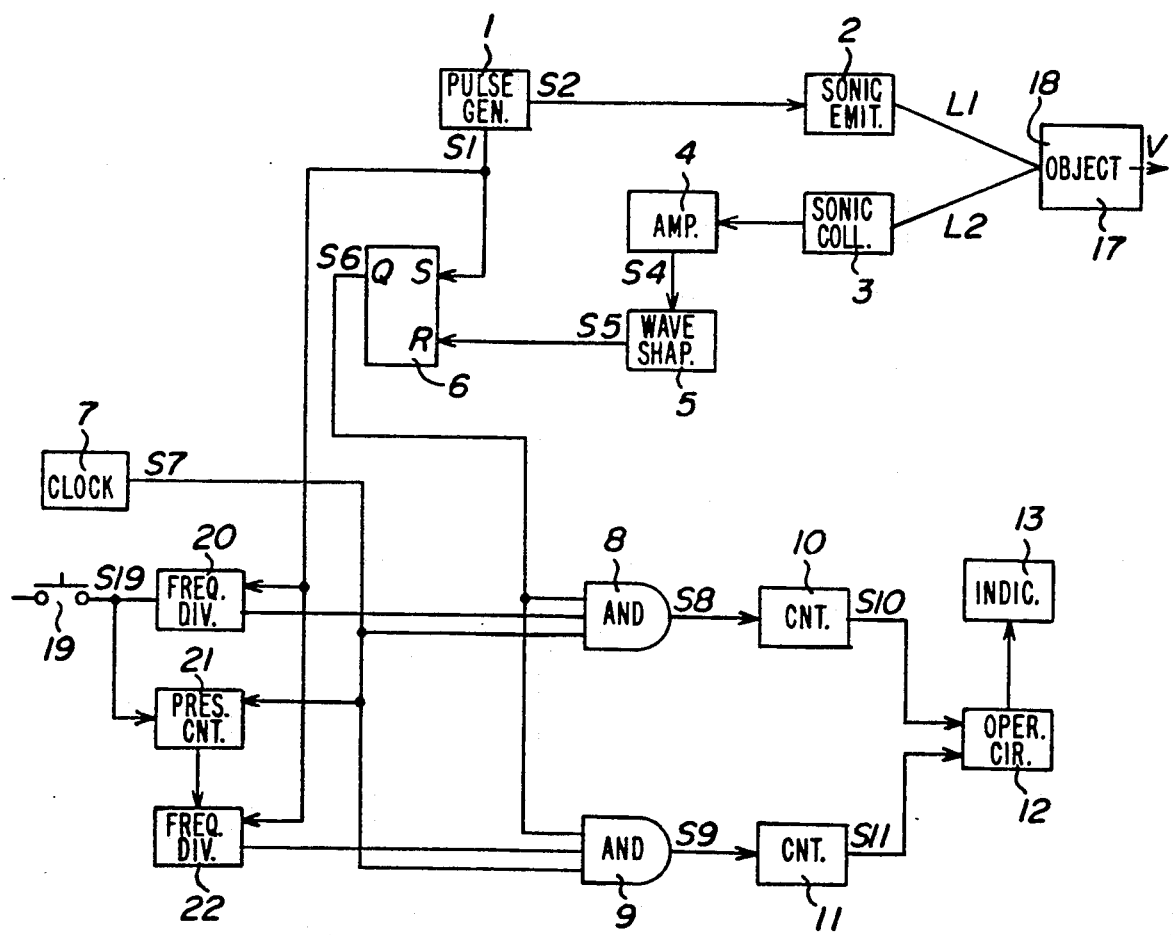
FIG. 4 is a block diagram of a second embodiment of the speed meter in accordance with the present invention.

A second embodiment of the speed meter in accordance with the present invention is shown in FIG. 4 in which the first and second timers 14, 16 in the foregoing embodiment are replaced by the first and second frequency dividers 20, 22 and the third timer 15 is replaced by a preset counter 21. The output signal S1 from the pulse generator 1 is passed to the first and second frequency dividers 20 and 22 and the output signal S7 from the clock pulse generator 7 is passed to the preset counter 21.

Figure 5:
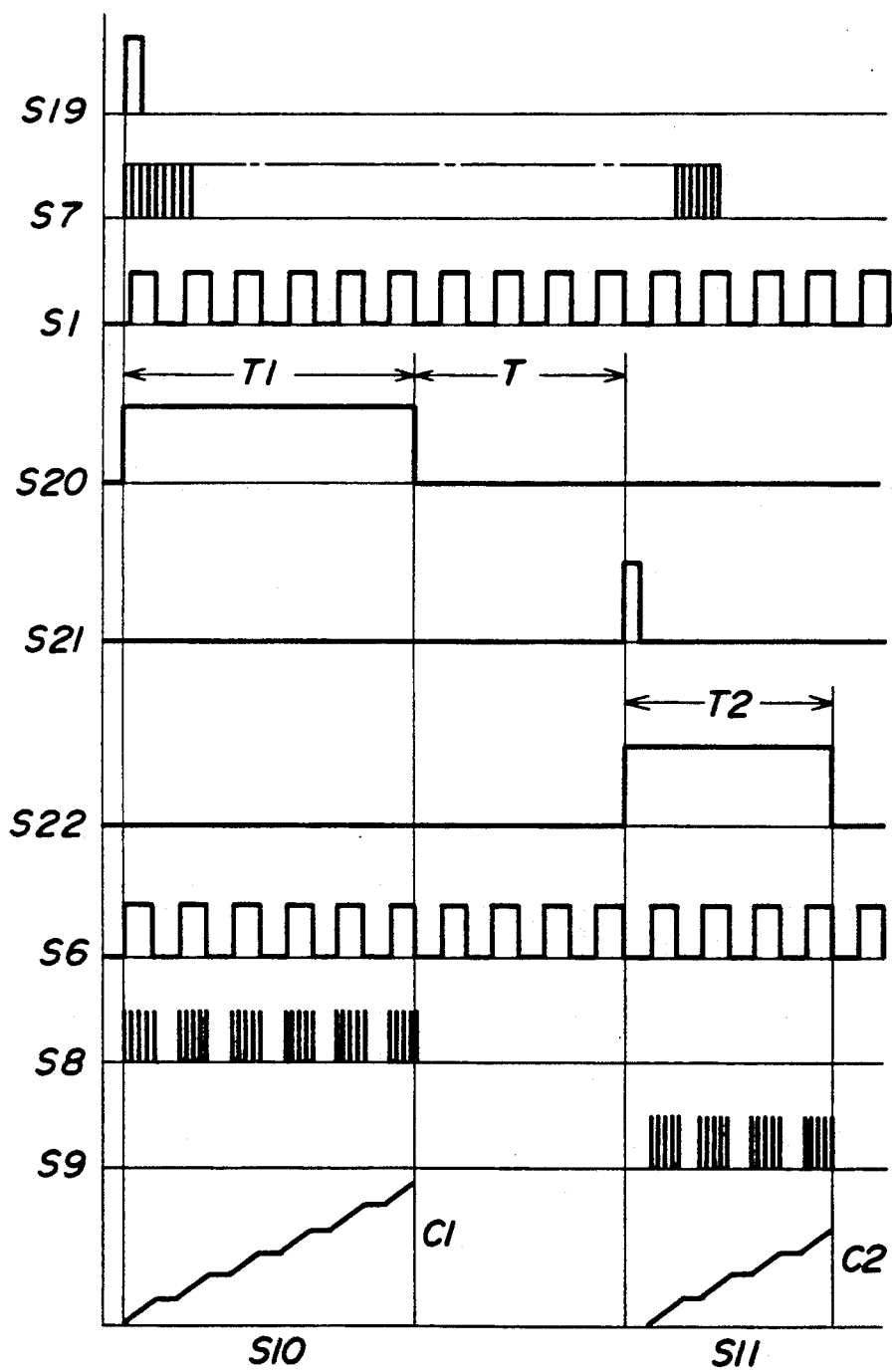
FIG. 5 is a timing diagram of signals processed in the speed meter shown in FIG. 4.

In FIG. 5, the signal S20 is issued by the first frequency divider 20 which is passed to the first AND gate 8. The signal S21 is a coincidence signal issued by the preset counter 21 when the number of the clock pulses received coincides with its preset value. This coincidence signal S21 triggers the second frequency divider 22. Signal S8 includes clock pulses allowed to go through the first AND gate 8 during the operation period T1 of the first frequency divider 20 and passed to the first counter 10 whereas signal S9 includes clock pulses allowed to go through the second AND gate 9 during the operation period T2 of the second frequency divider 22 and passed to the second counter 11. The operation periods T1 and T2 are separated by an operation interval T which is adjusted by setting of the set value of the preset counter 21. The final count values C1 and C2 of the counters 10 and 11 are used for calculations in equations (1) to (3) as in the foregoing embodiment.

Calculation of the above-described equation (3) can be much simplified by use of the technique of frequency division. When the dividing ratio of the frequency dividers 20 and 22 is equal to N and that of the third timer 15 in the foregoing embodiment is equal to M, the following relationships are obtained.

$$T1 = T2 = N \cdot T0$$

$$T3 = M \cdot T4$$

When these relationships are introduced into the equation (3), the difference Δ C is given as follows;

$$\Delta C = M \cdot N \cdot V/V0 \quad (4)$$

Assuming that V0 is equal to 360m/min, T4 is equal to $1 \times 10^{-6}$ sec and N=200, a degree of resolution of 1 mm/min for the speed V of the mobile object 17 can be obtained with M=108,000 and T3=0.108 sec. These values are acceptable without causing any difficulty in construction of the speed meter in accordance with the present invention.

As is clear from the equation (4), the preciseness in measurement is influenced by the preciseness in dividing ratios of the frequency dividers only.

Digital processing of signals in the speed meter of the present invention allows a simple construction and a low production cost. Use of ultrasonic sound for speed detection avoids any interfering influence caused by the state of face of the mobile object.

I claim:
1. An ultrasonic speed meter comprising
  a pulse generator,
  a clock pulse generator,
  a detection head connected to said pulse generator and including an ultrasonic emitter and an ultrasonic collector both directed towards a sound re- flective face of a mobile object performing a linear displacement, first means for gating clock pulses over a first operation period, second means for gating clock pulses over a second operation period, a flip-flop having a set terminal connected to said pulse generator, a reset terminal responsive to a signal from said collector of said detection head, and an output terminal connected to said first and second gating means, means for fixing the interval between said first and second operation periods, a first counter connected to said first gating means and, after counting said clock pulses past said first gating means during said first operation period, generative of a first count value which indicates an average distance between said detection head and said reflective face of said mobile object during said first operation period, a second counter connected to said second gating means and, after counting said clock pulses past said second gating means during said second operation period, generative of a second count value which indicates an average distance between said detection head and said reflective face of said mobile object during said second operation period, and an operational circuit connected to said first and second counters for calculating an average speed of said linear displacement during said interval set by said fixing means on the basis of said first and second count values.

2. An ultrasonic speed meter as claimed in claim 1 in which said first gating means includes a first AND gate, said second gating means includes a second AND gate, and each said AND gate has one input terminal connected to said output terminal of said flip-flop and another input terminal connected to said clock pulse generator.

3. An ultrasonic speed meter as claimed in claim 2 in which said first gating means includes a first timer connected to a third input terminal of said first AND gate, said second gating means includes a second timer connected to a third input terminal of said second AND gate, and said fixing means includes a third timer which generates a signal which initiates said second timer.

4. An ultrasonic speed meter as claimed in claim 2 in which said first gating means includes a first frequency divider connected to a third input terminal of said first AND gate, said second gating means includes a second frequency divider connected to a third input terminal of said second AND gate, and said fixing means includes a preset counter which generates a signal which initiates said second timer.

* * * * *